(12) United States Patent
Nakajima

(10) Patent No.: US 7,185,140 B2
(45) Date of Patent: Feb. 27, 2007

(54) METHOD FOR STORING IN NONVOLATILE MEMORY AND STORAGE UNIT

(75) Inventor: Isamu Nakajima, Kawasaki (JP)

(73) Assignee: Spansion, LLC, Sunnyvale, CA (US)

( * ) Notice: Subject to any disclaimer, the term of this patent is extended or adjusted under 35 U.S.C. 154(b) by 394 days.

(21) Appl. No.: 10/727,481

(22) Filed: Dec. 5, 2003

(65) Prior Publication Data

US 2004/0128432 A1    Jul. 1, 2004

(30) Foreign Application Priority Data

Dec. 25, 2002    (JP)    ............... 2002-374366

(51) Int. Cl.
*G06F 12/00*    (2006.01)
(52) U.S. Cl. .............. 711/103; 711/154; 711/156
(58) Field of Classification Search ............ None
See application file for complete search history.

(56) References Cited

U.S. PATENT DOCUMENTS

| | | | | |
|---|---|---|---|---|
| 6,526,472 B2 * | 2/2003 | Suzuki | ............ | 711/103 |
| 6,687,784 B2 * | 2/2004 | Douniwa et al. | ............ | 711/103 |
| 6,757,792 B2 * | 6/2004 | Morishita et al. | ............ | 711/154 |
| 6,871,259 B2 * | 3/2005 | Hagiwara et al. | ............ | 711/103 |
| 6,964,018 B1 * | 11/2005 | Masui | ............ | 715/530 |

FOREIGN PATENT DOCUMENTS

| | | | | |
|---|---|---|---|---|
| JP | 06-161493 | 6/1994 | ............ | 5/4 |
| JP | 09-297713 | 11/1997 | ............ | 12/16 |
| JP | 2000-132464 | 5/2000 | ............ | 12/16 |

* cited by examiner

*Primary Examiner*—Reginald Bragdon
*Assistant Examiner*—Jasmine Song
(74) *Attorney, Agent, or Firm*—Arent Fox LLP

(57) ABSTRACT

A method for storing in a nonvolatile memory by which a data restoration process is performed properly after a return from, for example, a shutoff of the supply of power. A storage management information store section in a central processing unit stores storage management information regarding the storage management of data to be stored in a nonvolatile memory by a data store section. The unit of the data is smaller than an erase unit in the nonvolatile memory. A storage completion information store section stores storage completion information indicative of the completion of the storing of the storage management information in the nonvolatile memory. A stored information judgment section judges, after a return from interruption of a process which occurred in the middle of the storage management information being stored, by referring to the storage completion information whether the storing of the storage management information is completed. Therefore, if the storing of storage management information is completed, a data restoration process can be performed properly by rewriting data.

7 Claims, 10 Drawing Sheets ically, to a method for storing in a nonvolatile memory which can be rewritten by a central processing unit and a storage unit for storing data in a rewritable nonvolatile memory.

METHOD FOR STORING IN NONVOLATILE MEMORY AND STORAGE UNIT

CROSS-REFERENCE TO RELATED APPLICATIONS

This application is based upon and claims the benefits of priority from the prior Japanese Patent Application No. 2002-374366, filed on Dec. 25, 2002, the entire contents of which are incorporated herein by reference.

BACKGROUND OF THE INVENTION (1) Field of the Invention

The present invention relates to a method for storing in a nonvolatile memory and a storage unit and, more particularly, to a method for storing in a nonvolatile memory which can be rewritten by a central processing unit and a storage unit for storing data in a rewritable nonvolatile memory.

(2) Description of the Related Art

Structurally nonvolatile memories, such as flash ROMs and EEPROMs, cannot be written unless data stored in them has been erased by the block or in block before writing data. That is to say, the same method that is used for rewriting data in RAMs cannot be adopted to rewrite data in them. Accordingly, there are drivers which make a user feel as if he/she were accessing a RAM in spite of access to a nonvolatile memory.

These drivers exercise control so that an address specified by an application will correspond on a one-to-one basis to an address in a nonvolatile memory where data can be written. By doing so, a user will feel as if he/she were accessing a RAM.

For example, it is assumed that an application gives instructions to store the data "1" at address A in a nonvolatile memory and that at this time a driver stores the data "1" at address B1 in the nonvolatile memory. Then it is assumed that the application gives instructions to store the data "2" at address A. If data in the nonvolatile memory has not been erased by the block or in block, the data "1" stored at address B1 cannot be rewritten to the data "2." The driver therefore stores the data "2" at new address B2 in the nonvolatile memory. The driver stores the correspondence between the address specified by the application and the address in the nonvolatile memory where the data was actually stored in the nonvolatile memory. Afterwards, the driver refers to this correspondence between the addresses when it reads the data. By doing so, the correct data can be read.

The writing of data by a driver to a nonvolatile memory will now be described. FIG. 8 is a flow chart showing procedures for the process of writing data performed by a driver. A driver will store data in a nonvolatile memory in accordance with the following procedures.

[Step S51] A driver searches a nonvolatile memory for an area (free area) where data can be written.

[Step S52] The driver writes write start information indicative of the beginning of writing the data into write management information in the nonvolatile memory.

[Step S53] The driver writes the data to the area it searched for in step S51.

[Step S54] The driver writes the correspondence between an address designated by an application to store the data and an address in the nonvolatile memory where the data was actually stored into address management information in the nonvolatile memory.

[Step S55] The driver writes write completion information indicative of the completion of the writing of the data into the write management information.

The driver refers to the correspondence between the addresses in the address management information to read the data the application requests from the nonvolatile memory.

Procedures for the process of rewriting data performed by a driver will now be described. FIG. 9 is a flow chart showing procedures for the process of rewriting data performed by a driver. A driver will rewrite data in a nonvolatile memory in accordance with the following procedures.

[Step S61] A driver searches a nonvolatile memory for an area (free area) where data for rewriting can be written.

[Step S62] The driver writes write start information indicative of the beginning of the writing of the data for rewriting into write management information in the nonvolatile memory.

[Step S63] The driver writes the data for rewriting to the area it searched for in step S61.

[Step S64] The driver writes the correspondence between an address designated by an application to store the data and a new address in the nonvolatile memory where the data for rewriting was actually stored into address management information in the nonvolatile memory.

[Step S65] The driver writes override information into address management information corresponding to data to be rewritten to negate the correspondence between addresses regarding the data to be rewritten.

[Step S66] The driver writes deletion completion information for negating (deleting) the data to be rewritten into the write management information.

[Step S67] The driver writes write completion information indicative of the completion of the writing of the data for rewriting into the write management information.

As stated above, by storing the address management information, the driver can also read the data for rewriting from the nonvolatile memory.

Procedures for a garbage collection process will now be described. FIG. 10 is a flow chart showing procedures for a garbage collection process performed by a driver. A driver will perform garbage collection in a nonvolatile memory in accordance with the following procedures.

[Step S71] A driver selects a copy source unit (this unit means an erase unit).

[Step S72] The driver writes copy start information to a header area in a copy destination unit which will become a spare unit.

[Step S73] The driver copies valid data in the copy source unit to the copy destination unit. This valid data means data which is not included in the deleted data described in step S66 in FIG. 9.

[Step S74] The driver writes copy completion information indicative of the completion of copying to the header area in the copy destination unit.

[Step S75] The driver writes deletion completion information for negating (deleting) the copy source unit to a header area in the copy source unit.

[Step S76] The driver erases data in the copy source unit. As a result, new data can be written to the copy source unit.

[Step S77] The driver writes header information to the header area in the copy source unit.

As stated above, the driver performs garbage collection, writing information to the header areas in the copy source unit and the copy destination unit.

It is assumed that the supply of power is shut off in the middle of a driver performing the above process of writing data to a nonvolatile memory and then returns to normal.

The driver refers to information, which is stored in the nonvolatile memory and which indicates the beginning and completion of writing the data, to judge whether the data written is reliable. If information indicative of the completion of the writing of the data is not stored, then the driver will perform the restoration process of writing the data again.

In addition, a method for storing comprising the steps of detecting a factor in interruption of writing data, adding data to this data according to the factor in the interruption, and determining the scope of reliable data is disclosed (see, for example, Japanese Unexamined Patent Publication No. 2000-132464, p.4 and FIG. 1).

However, if the supply of power is shut off in the middle of information (storage management information) regarding the correspondence between an address designated by an application and an address in a nonvolatile memory where data was actually stored being written and then returns to normal, the subsequent data restoration process may be performed on the basis of erroneous storage management information.

SUMMARY OF THE INVENTION

The present invention was made under the background circumstances as described above. An object of the present invention is to provide a method for storing in a nonvolatile memory and a storage unit by which a restoration process can be performed properly after a return from interruption of a process by judging whether the storing of storage management information is completed.

In order to achieve the above object, a method for storing in a nonvolatile memory which can be rewritten by a central processing unit is provided. This method for storing in a nonvolatile memory comprises the steps of storing storage management information regarding the storage management of data to be stored in the nonvolatile memory, the unit of the data being smaller than an erase unit in the nonvolatile memory, storing storage completion information indicative of the completion of the storing of the storage management information in the nonvolatile memory, and judging, after a return from interruption of a process which occurred in the middle of the storage management information being stored, by referring to the storage completion information whether the storing of the storage management information is completed.

Furthermore, in order to achieve the above object, a storage unit for storing data in a rewritable nonvolatile memory is provided. This storage unit comprises a storage management information store section for storing storage management information regarding the storage management of data to be stored in the nonvolatile memory, the unit of the data being smaller than an erase unit in the nonvolatile memory, a storage completion information store section for storing storage completion information indicative of the completion of the storing of the storage management information in the nonvolatile memory, and a stored information judgment section for judging, after a return from interruption of a process which occurred in the middle of the storage management information being stored, by referring to the storage completion information whether the storing of the storage management information is completed.

The above and other objects, features and advantages of the present invention will become apparent from the following description when taken in conjunction with the accompanying drawings which illustrate preferred embodiments of the present invention by way of example.

DESCRIPTION OF THE PREFERRED EMBODIMENT

An embodiment of the present invention will now be described with reference to the drawings.

Figure 1:
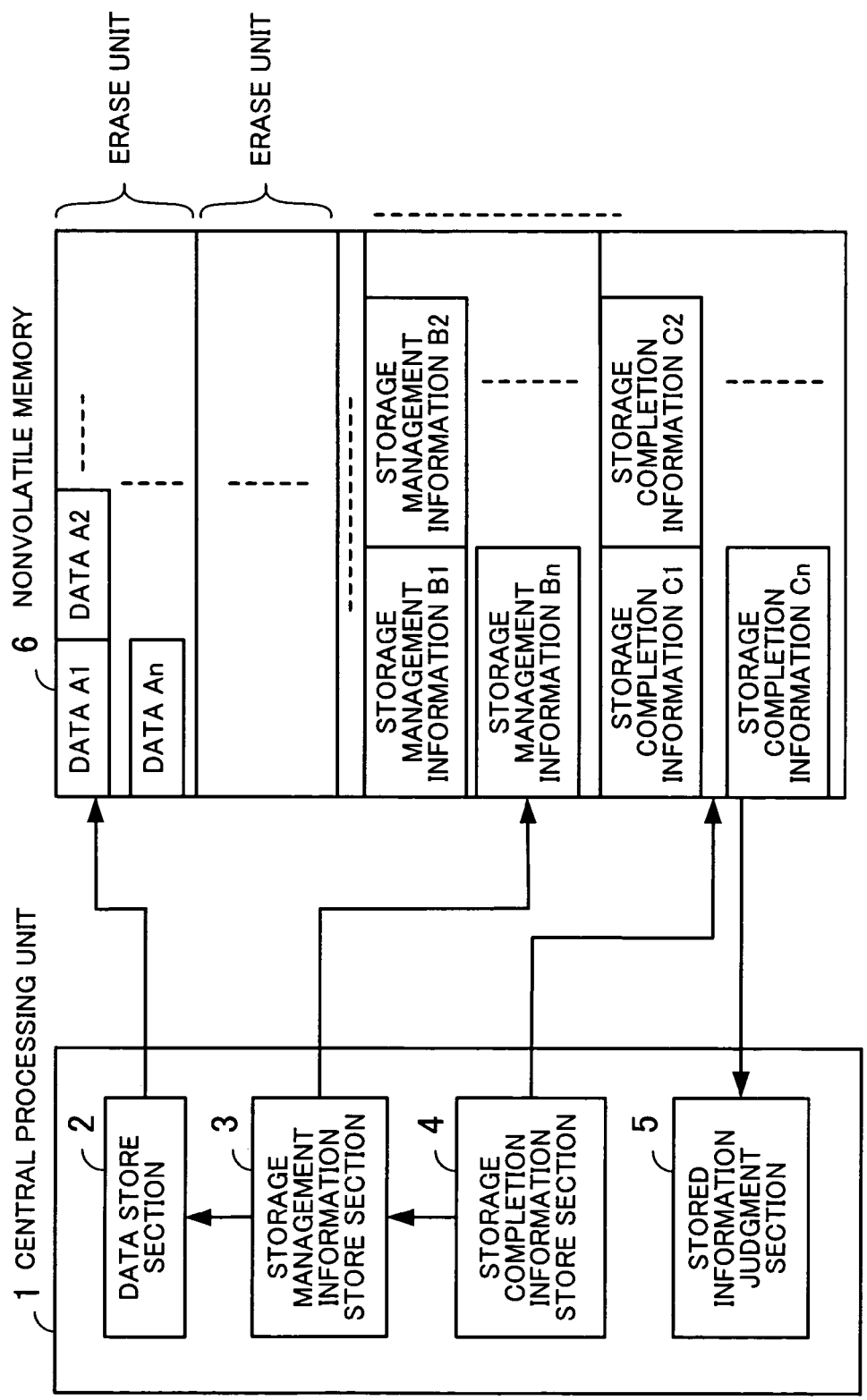
FIG. 1 shows the principles underlying the present invention.

FIG. 1 shows the principles underlying the present invention. By executing a driver for storing data in a rewritable nonvolatile memory 6, a central processing unit 1 shown in FIG. 1 stores data specified by an application it executes separately from the driver in the nonvolatile memory 6. The central processing unit 1 includes a data store section 2, a storage management information store section 3, a storage completion information store section 4, and a stored information judgment section 5 to execute the driver.

The data store section 2 stores data A1, A2, . . . , and An in the nonvolatile memory 6 in accordance with instructions from an application. The unit of each of the data is smaller than an erase unit The storage management information store section 3 stores storage management information B1, B2, . . . , and Bn regarding the storage management of data A1, A2, . . . , and An, respectively, in the nonvolatile memory 6. When data A1 is stored in the nonvolatile memory 6, the storage management information store section 3 stores storage management information B1 regarding data A1. Similarly, when data An is stored in the nonvolatile memory 6, the storage management information store section 3 stores storage management information Bn regarding data An.

Storage management information B1 is an address specified by, for example, an application to store data A1 and an address in the nonvolatile memory 6 where the data store section 2 actually stored data A1. The same applies to storage management information B2, . . . , and Bn.

When the storing of storage management information B1 in the nonvolatile memory 6 is completed, the storage completion information store section 4 stores storage completion information C1 indicative of the completion of storing storage management information B1 in the nonvolatile memory 6. The same applies to storage completion information C2, . . . , and Cn. Storage completion information C1 corresponds to storage management information B1. Similarly, storage completion information Cn corresponds to storage management information Bn.

When the power to, for example, the central processing unit 1 fails in the middle of the storage management information store section 3 storing storage management information B1 and then returns to normal, the stored information judgment section 5 judges by referring to storage completion information C1 whether storage management information B1 has been stored. The same applies to storage management information B2, . . . , and Bn.

Operation performed in FIG. 1 will now be described.

First, the data store section 2 stores data A1, A2, . . . , and An in the nonvolatile memory 6 in accordance with instructions from an application.

Each time the data store section 2 stores data A1, A2, . . . , or An, the storage management information store section 3 stores storage management information B1, B2, . . . , or Bn regarding data A1, A2, . . . , or An, respectively, in the nonvolatile memory 6.

Each time the storage management information store section 3 completes the storing of storage management information B1, B2, . . . , or Bn, the storage completion information store section 4 stores storage completion information C1, C2, . . . , or Cn respectively.

When the power fails in the middle of the storage management information store section 3 storing storage management information B1, B2, . . . , or Bn and then returns to normal, the stored information judgment section 5 judges by referring to storage completion information C1, C2, . . . , or Cn, respectively, whether storage management information B1, B2, . . . , or Bn has been stored in the nonvolatile memory 6.

As stated above, when the storing of storage management information in a nonvolatile memory is completed, storage completion information indicative of the completion of storing is stored in the nonvolatile memory. Then whether the storage management information has been written is judged by referring to the storage completion information. Therefore, even if a process is interrupted due to, for example, a power failure, the process of restoring data can be performed properly.

Figure 2:
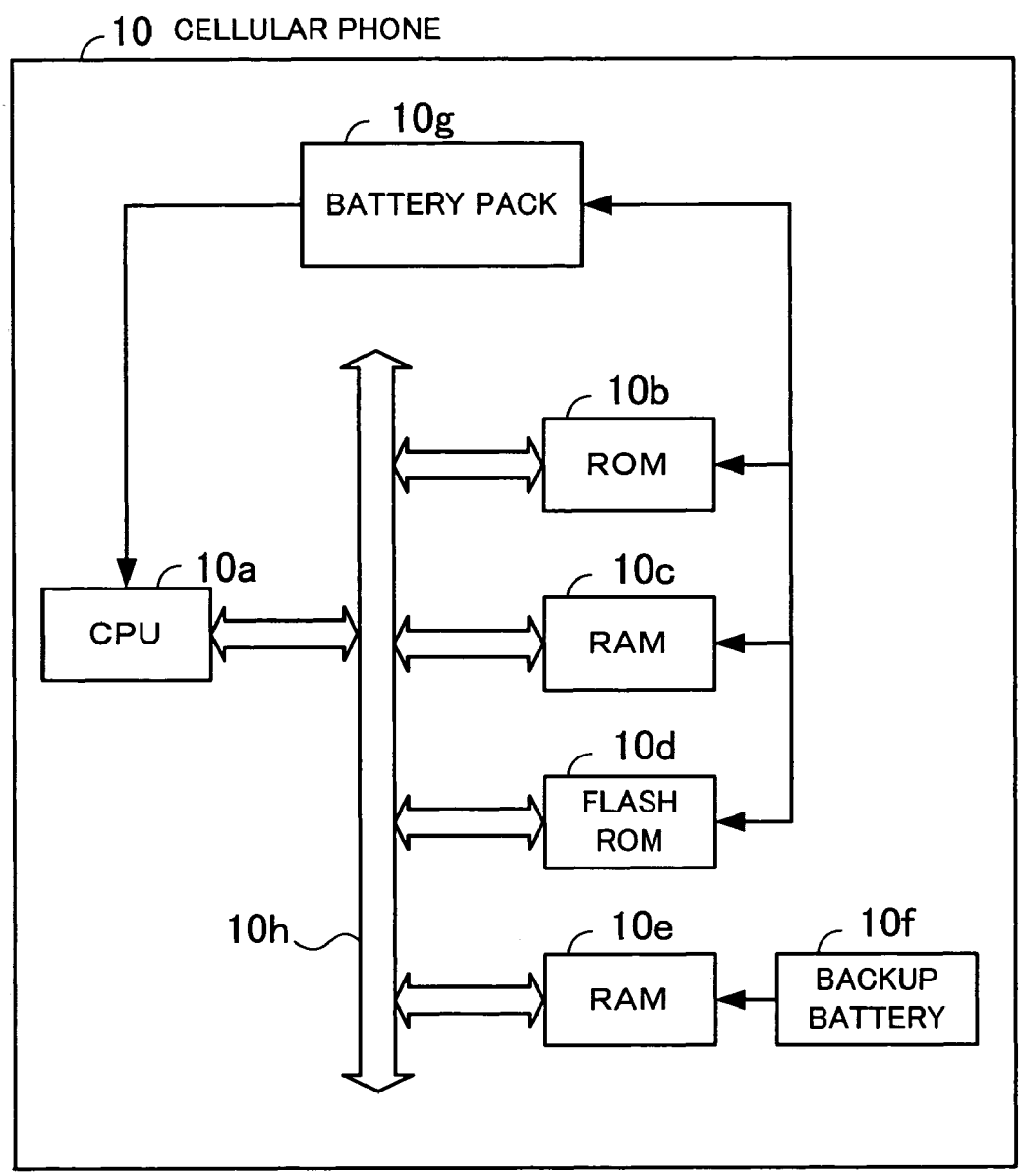
FIG. 2 shows the hardware structure of a cellular phone to which a store method in a nonvolatile memory according to the present invention is applied.

An example of a case where a store method in a nonvolatile memory according to the present invention is applied to a cellular telephone will now be described. FIG. 2 shows the hardware structure of a cellular phone to which a store method in a nonvolatile memory according to the present invention is applied. As shown in FIG. 2, a cellular phone 10 comprises a CPU 10a, a ROM 10b, a RAM 10c, a flash ROM 10d, a RAM 10e, a backup battery 10f, a battery pack 10g, and a bus 10h.

The CPU 10a is connected to the ROM 10b, the RAM 10c, the flash ROM 10d, and the RAM 10e via the bus 10h and controls the entire unit.

The ROM 10b stores an operating system (OS) program, an application program with a telephonic communication function, an application program with an address book function, and the like. The ROM 10b also stores a driver program used for storing data to be processed by the CPU 10a in the flash ROM 10d.

The RAM 10c temporarily stores at least part of the OS, an application, or the driver executed by the CPU 10a. The RAM 10c also stores various pieces of data necessary for a process performed by the CPU 10a.

The flash ROM 10d stores data, including an address book, which must not be lost. The flash ROM 10d is a rewritable nonvolatile memory. For example, even if the supply of power from the battery pack 10g, being a main power source in the cellular phone 10, is shut off, data stored in the flash ROM 10d will be held. The flash ROM 10d need only be a rewritable nonvolatile memory which can hold data even in the case of the supply of power being shut off, and may be, for example, an EEPROM.

The RAM 10e stores data, including data for setting the function of the cellular phone 10, which must not be lost. Power is always supplied from the backup battery 10f to the RAM 10e. Therefore, even if the supply of power from the battery pack 10g, being a main power source in the cellular phone 10, is shut off, data stored in the RAM 10e will be held.

The battery pack 10g attached to the backside of the cellular phone 10 supplies power to the CPU 10a, the ROM 10b, the RAM 10c, and the flash ROM 10d.

By adopting the above structure, the cellular phone 10 can realize a telephonic communication function, an address book function, and the like.

A function realized by the CPU 10a executing the driver for storing data in the flash ROM 10d will now be described. When the CPU 10a writes data to or reads data from the flash ROM 10d by executing, for example, an address book application, the CPU 10a will execute the driver to access the flash ROM 10d.

Figure 3:
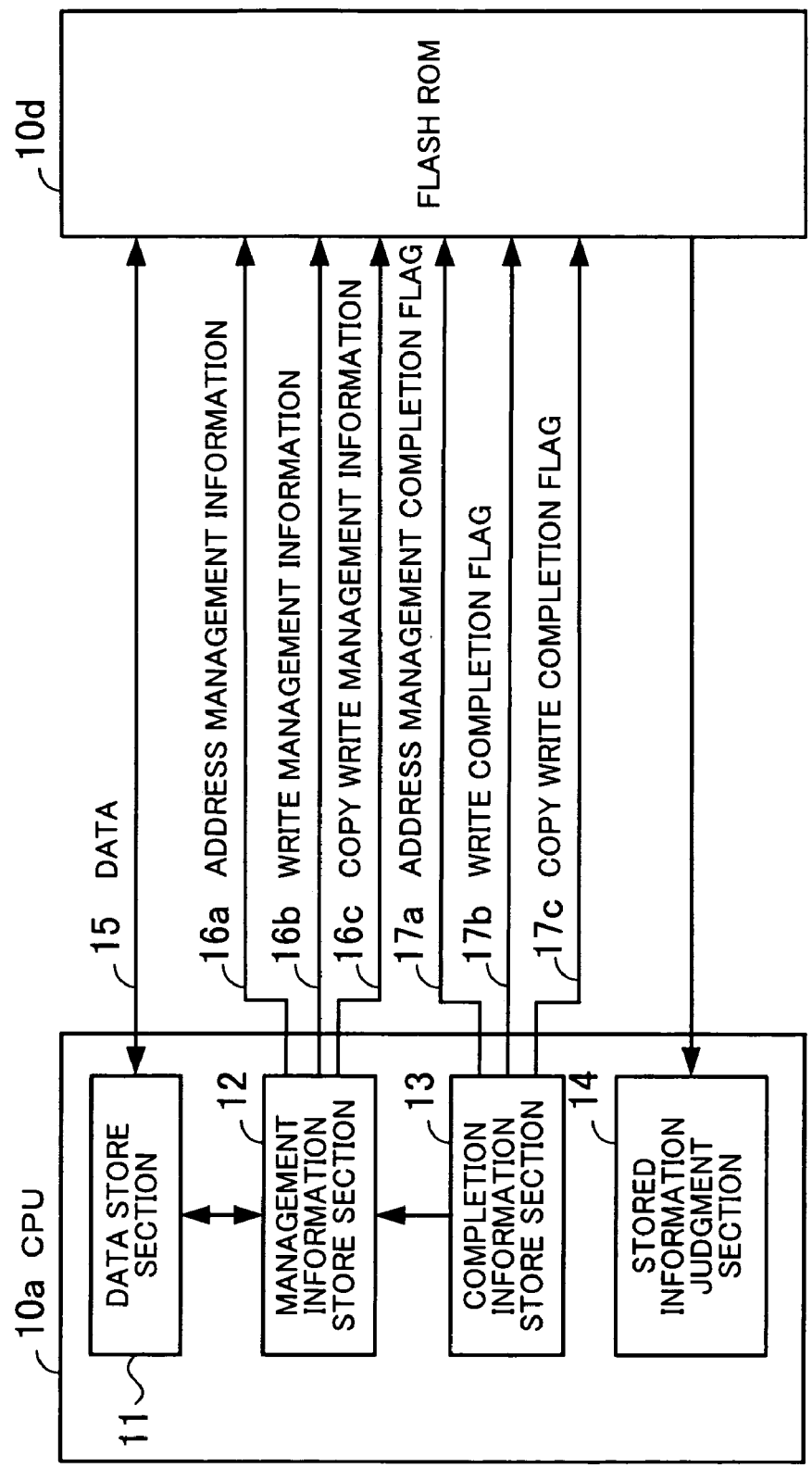
FIG. 3 is a functional block diagram of a CPU.

FIG. 3 is a functional block diagram of the CPU. As shown in FIG. 3, the CPU 10a includes a data store section 11, a management information store section 12, a completion information store section 13, and a stored information judgment section 14. In addition, data 15, address management information 16a, write management information 16b, copy write management information 16c, an address management completion flag 17a, a write completion flag 17b, and a copy write completion flag 17c to be stored in the flash ROM 10d are shown in FIG. 3.

The data store section 11 writes the data 15 to a free area, being an area where data is not written after erasing, in the flash ROM 10d in accordance with instructions from an application to write it. Furthermore, in accordance with instructions from an application to read, the data store section 11 refers to the address management information 16a stored in the flash ROM 10d (described later in detail) and reads the stored data 15 from the flash ROM 10d. The data store section 11 also erases stored data by the erase unit (described later in detail).

When the data store section 11 stores the data 15 in the flash ROM 10d, the management information store section 12 stores the address management information 16a regarding the management of the address of the data 15 in the flash ROM 10d. The address management information 16a consists of an address designated on an application to write the data 15, an address in the flash ROM 10d where the data store section 11 actually writes the data 15, and information which indicates that these addresses are valid or invalid. An application may designate a location where the data 15 is to be stored by a file name in place of an address. In this case, the address management information 16a will include not an address but a file name.

When a request to read the data 15 is made by an application, the data store section 11 refers to the address management information 16a, obtains an address in the flash ROM 10d which corresponds to an address designated on the application and at which the data 15 was actually stored, and reads the data 15 stored at this address.

Furthermore, when the data store section 11 stores the data 15 in the flash ROM 10d, the management information store section 12 stores the write management information 16b regarding the writing of the data 15 in the flash ROM 10d. The write management information 16b consists of information which indicates that the data store section 11 begins to write the data 15 to the flash ROM 10*d*, information which indicates that the data store section 11 completes the writing of the data 15, and information which indicates that the data store section 11 deletes (negates) the data 15 it wrote.

In addition, the management information store section 12 stores the copy write management information 16*c* regarding a garbage collection process (described later in detail) in the flash ROM 10*d*. The copy write management information 16*c* consists of information indicative of the beginning of the copying of data in a garbage collection process, information indicative of the completion of the copying of the data in the garbage collection process, and information indicative of the deletion of the data from the copy source in the garbage collection process.

When the management information store section 12 completes the writing of the address management information 16*a* to the flash ROM 10*d*, the completion information store section 13 writes the address management completion flag 17*a* indicative of the completion of writing to the flash ROM 10*d*.

Moreover, when the management information store section 12 completes the writing of the write management information 16*b* to the flash ROM 10*d*, the completion information store section 13 writes the write completion flag 17*b* indicative of the completion of writing to the flash ROM 10*d*.

In addition, when the management information store section 12 completes the writing of the copy write management information 16*c* to the flash ROM 10*d*, the completion information store section 13 writes the copy write completion flag 17*c* indicative of the completion of writing to the flash ROM 10*d*.

If in the middle of the management information store section 12 writing the address management information 16*a*, the write management information 16*b*, or the copy write management information 16*c*, the supply of power from the battery pack 10*g* is shut off due to, for example, its removal from the body of the cellular phone 10 or the hardware is reset, and then returns to normal, the stored information judgment section 14 judges by referring to the address management completion flag 17*a*, the write completion flag 17*b*, or the copy write completion flag 17*c* whether the writing of this management information is completed.

For example, it is assumed that the supply of power is shut off in the middle of the management information store section 12 writing the address management information 16*a* to the flash ROM 10*d* and that the writing of the address management information 16*a* is not completed. In this case, the address management completion flag 17*a* which indicates that the writing of the address management information 16*a* is not completed will be stored in the flash ROM 10*d*. Therefore, when the supply of power returns to normal, the stored information judgment section 14 can judge by referring to the address management completion flag 17*a* that the writing of the address management information 16*a* is not completed.

Each of the address management completion flag 17*a*, the write completion flag 17*b*, and the copy write completion flag 17*c* is 1-bit data. Whether writing is completed will be indicated by the use of "0" or "1." By using 1-bit data, variations in write time in each memory cell in the flash ROM 10*d* can be decreased. Each of the address management completion flag 17*a*, the write completion flag 17*b*, and the copy write completion flag 17*c* may be data made up of more than one bit. In this case, the stored information judgment section 14 should judge all values to be invalid (storing is not completed) except the one indicative of the completion of storing. This will reduce the possibility of the stored information judgment section 14 misjudging, which results from a wrong value stored due to, for example, the supply of power being shut off.

Figure 4:
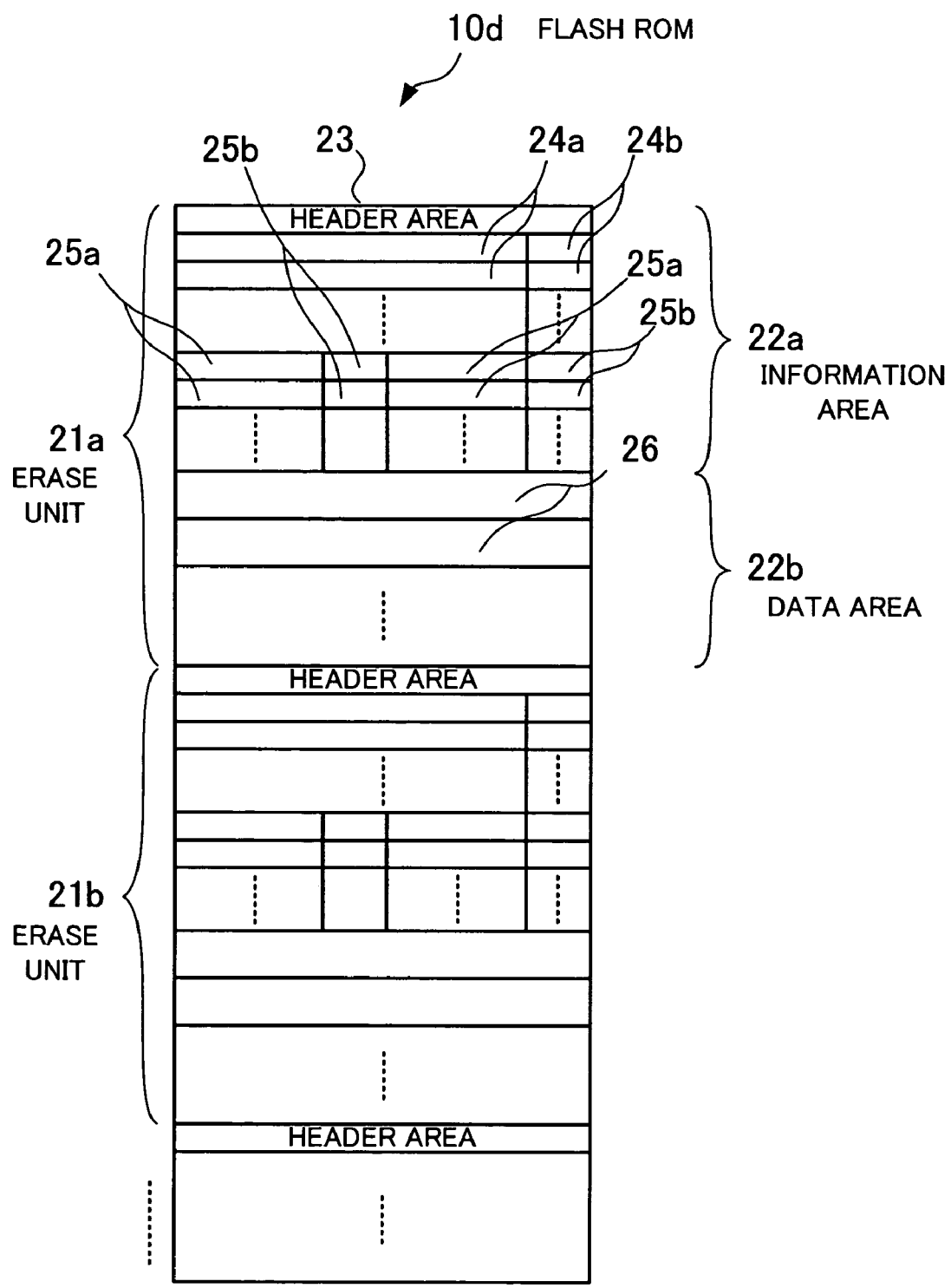
FIG. 4 shows an example of the storage structure of a flash memory.

The storage structure of the flash ROM 10*d* will now be described. FIG. 4 shows an example of the storage structure of the flash memory. As shown in FIG. 4, a storage area in the flash ROM 10*d* is divided into erase units 21*a*, 21*b*, . . . Data stored in the flash ROM 10*d* can be erased by the erase unit. Each of the erase units 21*a*, 21*b*, . . . has the same storage structure, so only the storage structure of the erase unit 21*a* will now be described.

The erase unit 21*a* is divided into an information area 22*a* and a data area 22*b*. The information area 22*a* is divided into a header area 23, management areas 24*a* and 25*a*, and flag areas 24*b* and 25*b*. The copy write management information 16*c* and the copy write completion flag 17*c* described in FIG. 3 are stored in the header area 23. The address management information 16*a* is stored in the management area 24*a*. The address management completion flag 17*a* is stored in the flag area 24*b*. The write management information 16*b* is stored in the management area 25*a*. The write completion flag 17*b* is stored in the flag area 25*b*.

The address management information 16*a* and the address management completion flag 17*a* are associated with each other and are stored so that there will be relationship between them. The same applies to the write management information 16*b* and the write completion flag 17*b* and to the copy write management information 16*c* and the copy write completion flag 17*c*.

The data area 22*b* is divided into smaller areas 26. The unit of the data 15 written to the areas 26 is smaller than the erase unit in the flash ROM 10*d*. When the data store section 11 shown in FIG. 3 stores a piece of data 15 in the area 26 in the data area 22*b*, the management information store section 12 stores the address management information 16*a* and write management information 16*b* related to this piece of data 15. The completion information store section 13 stores the address management completion flag 17*a* or the write completion flag 17*b* in the information area 22*a*.

By the way, if the process of rewriting data at the same address is performed on an application, the overwriting of data cannot be performed at the same address in the flash ROM 10*d*. Therefore, the management information store section 12 negates the address management information 16*a* corresponding data to be rewritten to make it invalid and stores the address management information 16*a* regarding the address of new data for rewriting. If the process of rewriting data is performed many times, negated (deleted) data will occupy the data area 22*b*. Accordingly, a garbage collection process will be performed to remove negated data.

The data store section 11 selects an unused erase unit. The data store section 11 refers to information, which is included in the write management information 16*b* and which indicates that written data was deleted, selects only data (valid data) not deleted, and copies it to the data area 22*b* in the unused erase unit.

Figure 5:
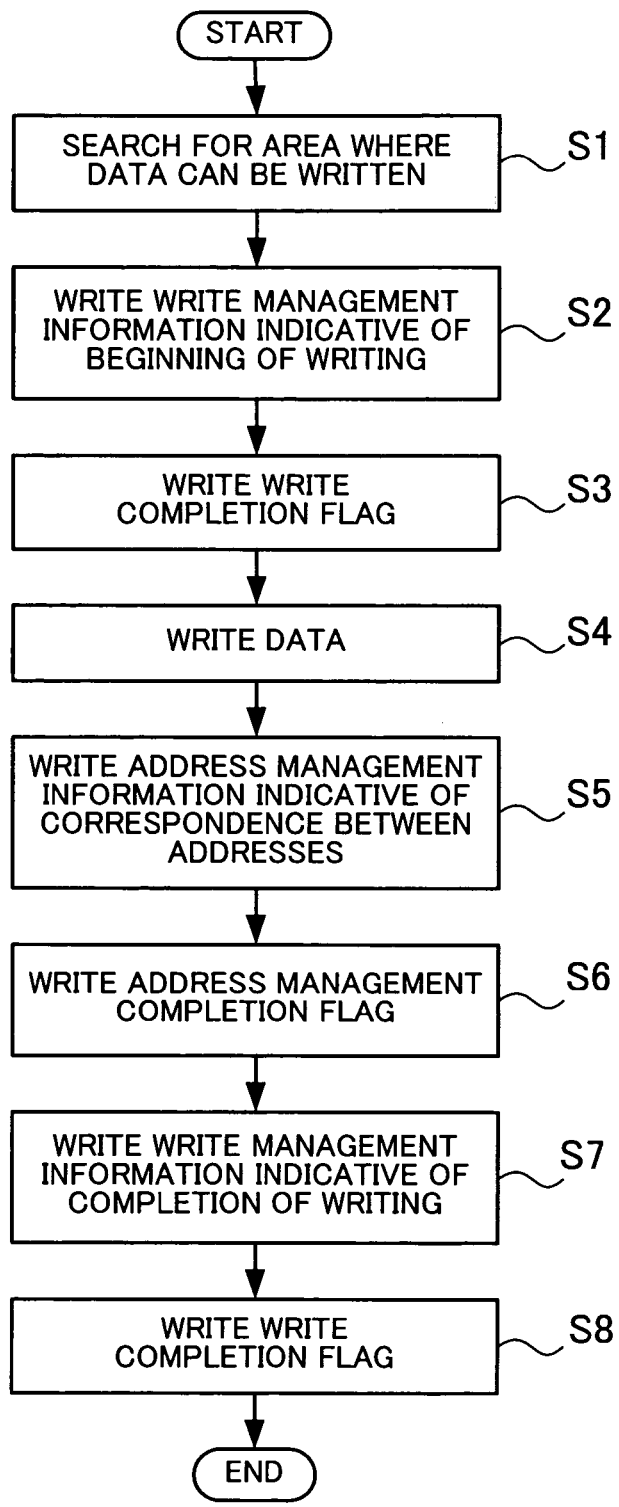
FIG. 5 is a flow chart showing procedures for the process of writing data performed by a CPU.

Procedures for processes performed by the CPU 10*a* shown in FIG. 3 will now be described by the use of flow charts. FIG. 5 is a flow chart showing procedures for the process of writing data performed by the CPU. In accordance with the following procedures the CPU 10*a* will write the data 15 to the flash ROM 10*d*.

[Step S1] The data store section 11 in the CPU 10*a* searches the flash ROM 10*d* for an area where the data 15 can be written.

[Step S2] The management information store section 12 in the CPU 10a writes the write management information 16b indicative of the beginning of writing the data 15 to the flash ROM 10d.

[Step S3] The completion information store section 13 in the CPU 10a writes the write completion flag 17b indicative of the completion of the writing of the write management information 16b in step S2 to the flash ROM 10d.

[Step S4] The data store section 11 in the CPU 10a writes the data 15 designated by an application to the area in the flash ROM 10d to which the data 15 can be written and which was searched for in step S1.

[Step S5] The management information store section 12 in the CPU 10a writes the address management information 16a indicative of an address designated on the application and an address in the flash ROM 10d where the data 15 was actually stored (indicative of the correspondence between these addresses) to the flash ROM 10d.

[Step S6] The completion information store section 13 in the CPU 10a writes the address management completion flag 17a indicative of the completion of the writing of the address management information 16a in step S5 to the flash ROM 10d.

[Step S7] The management information store section 12 in the CPU 10a writes the write management information 16b indicative of the completion of the writing of the data 15 to the flash ROM 10d.

[Step S8] The completion information store section 13 in the CPU 10a writes the write completion flag 17b indicative of the completion of the writing of the write management information 16b to the flash ROM 10d.

It is assumed that while the CPU 10a is performing the process in step S2, S5, or S7, the supply of power is shut off. When the supply of power returns to normal, the stored information judgment section 14 in the CPU 10a refers to the address management completion flag 17a and the write completion flag 17b to judge whether the writing of the address management information 16a and the write management information 16b was completed. If the writing of the address management information 16a and the write management information 16b was completed, then the CPU 10a can perform a data restoration process properly by, for example, resuming the interrupted process. If the writing of the address management information 16a and the write management information 16b was not completed, then the CPU 10a can perform, for example, the process of restoring the address management information 16a and the write management information 16b. Alternatively, the CPU 10a may negate the address management information 16a and the write management information 16b so that they will not influence a subsequent process.

Figure 6:
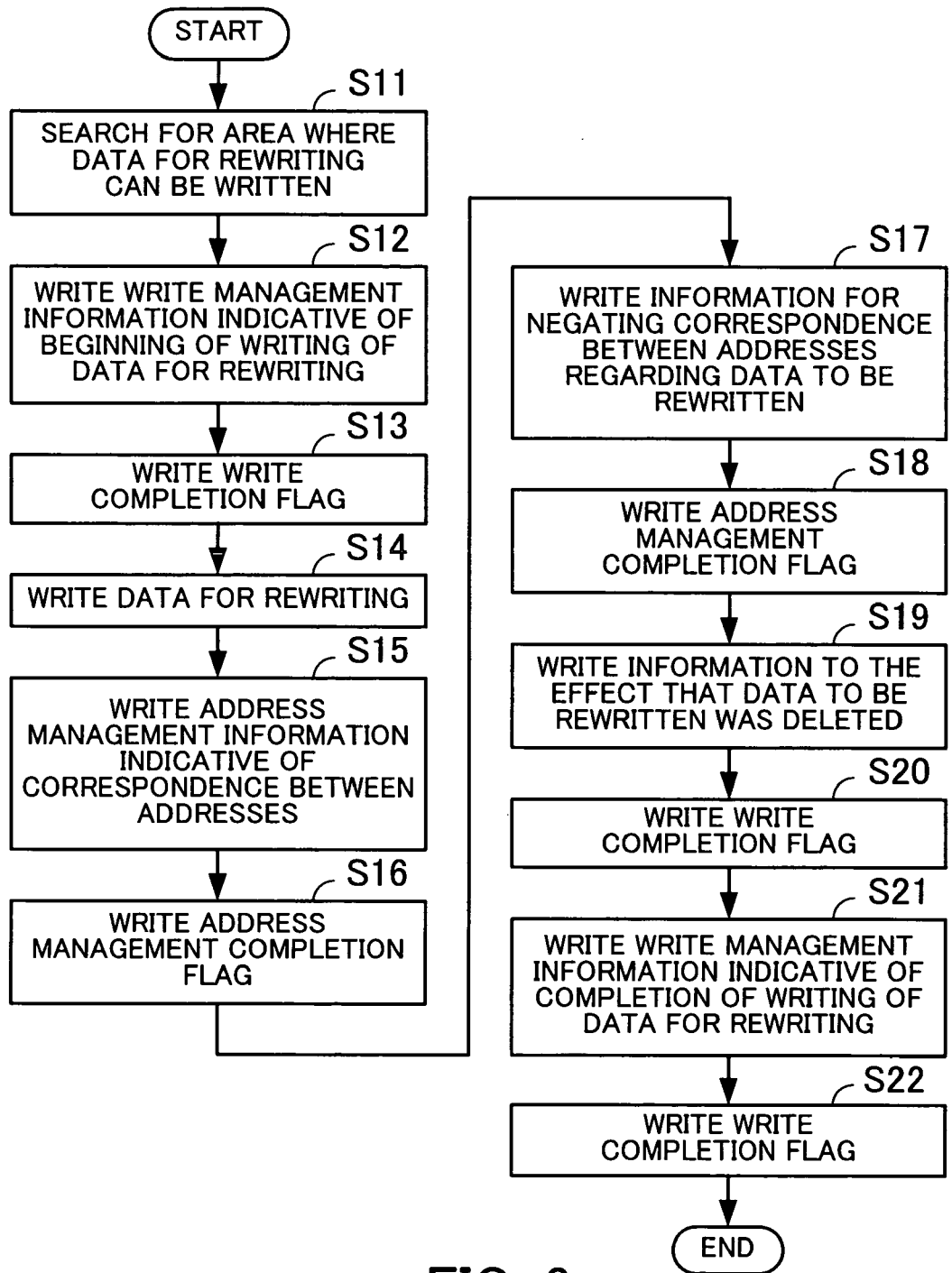
FIG. 6 is a flow chart showing procedures for the process of rewriting data performed by a CPU.

The process of rewriting data stored in the flash ROM 10d will now be described. FIG. 6 is a flow chart showing procedures for the process of rewriting data performed by the CPU. In accordance with the following procedures the CPU 10a will rewrite data stored in the flash ROM 10d.

[Step S11] The data store section 11 in the CPU 10a searches the flash ROM 10d for an area where the new data 15 used for rewriting (data 15 for rewriting) can be written.

[Step S12] The management information store section 12 in the CPU 10a writes the write management information 16b indicative of the beginning of the writing of the data 15 for rewriting to the flash ROM 10d.

[Step S13] The completion information store section 13 in the CPU 10a writes the write completion flag 17b indicative of the completion of the writing of the write management information 16b in step S12 to the flash ROM 10d.

[Step S14] The data store section 11 in the CPU 10a writes the data 15 for rewriting designated by an application to the area in the flash ROM 10d to which the data 15 for rewriting can be written and which was searched for in step S11.

[Step S15] The management information store section 12 in the CPU 10a writes the address management information 16a indicative of an address designated on the application and an address in the flash ROM 10d where the data 15 for rewriting was actually stored (indicative of the correspondence between these addresses) to the flash ROM 10d.

[Step S16] The completion information store section 13 in the CPU 10a writes the address management completion flag 17a indicative of the completion of the writing of the address management information 16a in step S15 to the flash ROM 10d.

[Step S17] The management information store section 12 in the CPU 10a writes information for negating the correspondence between addresses into the address management information 16a regarding data to be rewritten.

[Step S18] The completion information store section 13 in the CPU 10a writes the address management completion flag 17a indicative of the completion of the writing of the address management information 16a in step S17 to the flash ROM 10d.

[Step S19] The management information store section 12 in the CPU 10a writes information to the effect that the data to be rewritten was deleted into the write management information 16b regarding it.

[Step S20] The completion information store section 13 in the CPU 10a writes the write completion flag 17b indicative of the completion of the writing of the write management information 16b in step S19 to the flash ROM 10d.

[Step S21] The management information store section 12 in the CPU 10a stores the write management information 16b indicative of the completion of the writing of the data 15 for rewriting in the flash ROM 10d.

[Step S22] The completion information store section 13 in the CPU 10a writes the write completion flag 17b indicative of the completion of the writing of the write management information 16b in step S21 to the flash ROM 10d.

It is assumed that while the CPU 10a is performing the process in step S12, S15, S17, S19, or S21, the supply of power is shut off. When the supply of power returns to normal, the stored information judgment section 14 in the CPU 10a refers to the address management completion flag 17a and the write completion flag 17b to judge whether the writing of the address management information 16a and the write management information 16b was completed. If the writing of the address management information 16a and the write management information 16b was completed, then the CPU 10a can perform a data restoration process properly by, for example, resuming the interrupted process. If the writing of the address management information 16a and the write management information 16b was not completed, then the CPU 10a can perform, for example, the process of restoring the address management information 16a and the write management information 16b. Alternatively, the CPU 10a may negate the address management information 16a and the write management information 16b so that they will not influence a subsequent process.

Figure 7:
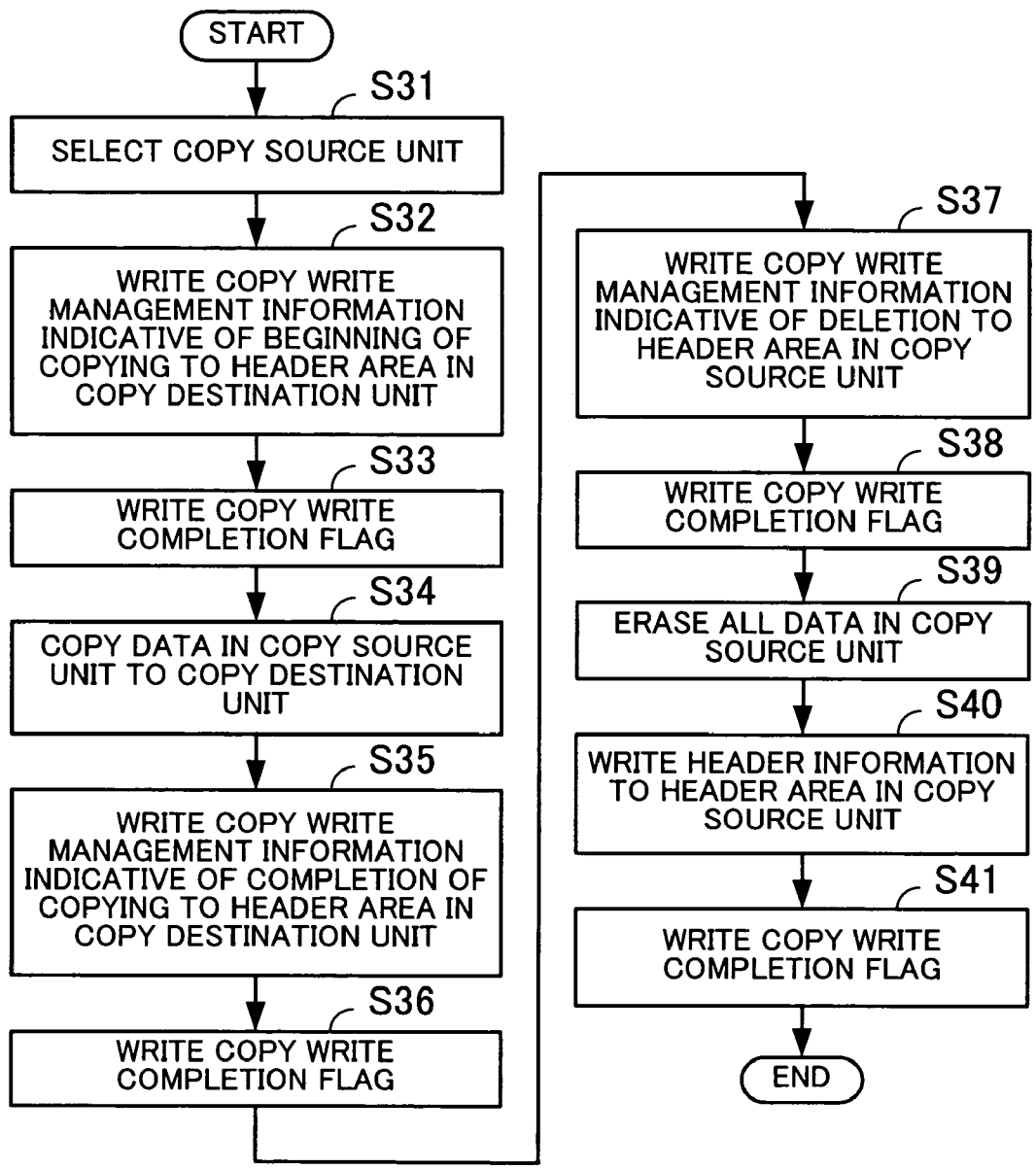
FIG. 7 is a flow chart showing procedures for a garbage collection process performed by a CPU.
Figure 8:
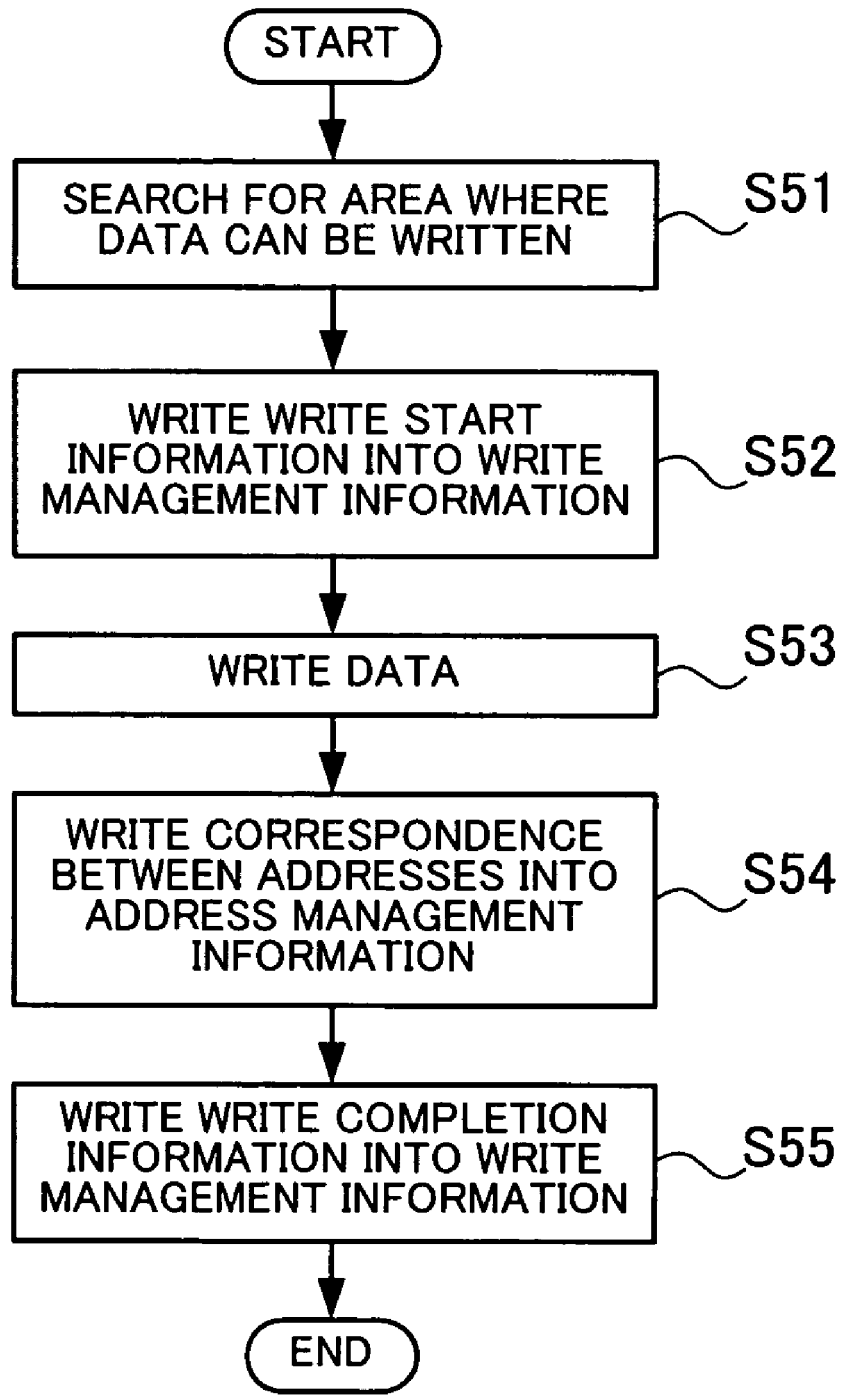
FIG. 8 is a flow chart showing procedures for the process of writing data performed by a driver.
Figure 9:
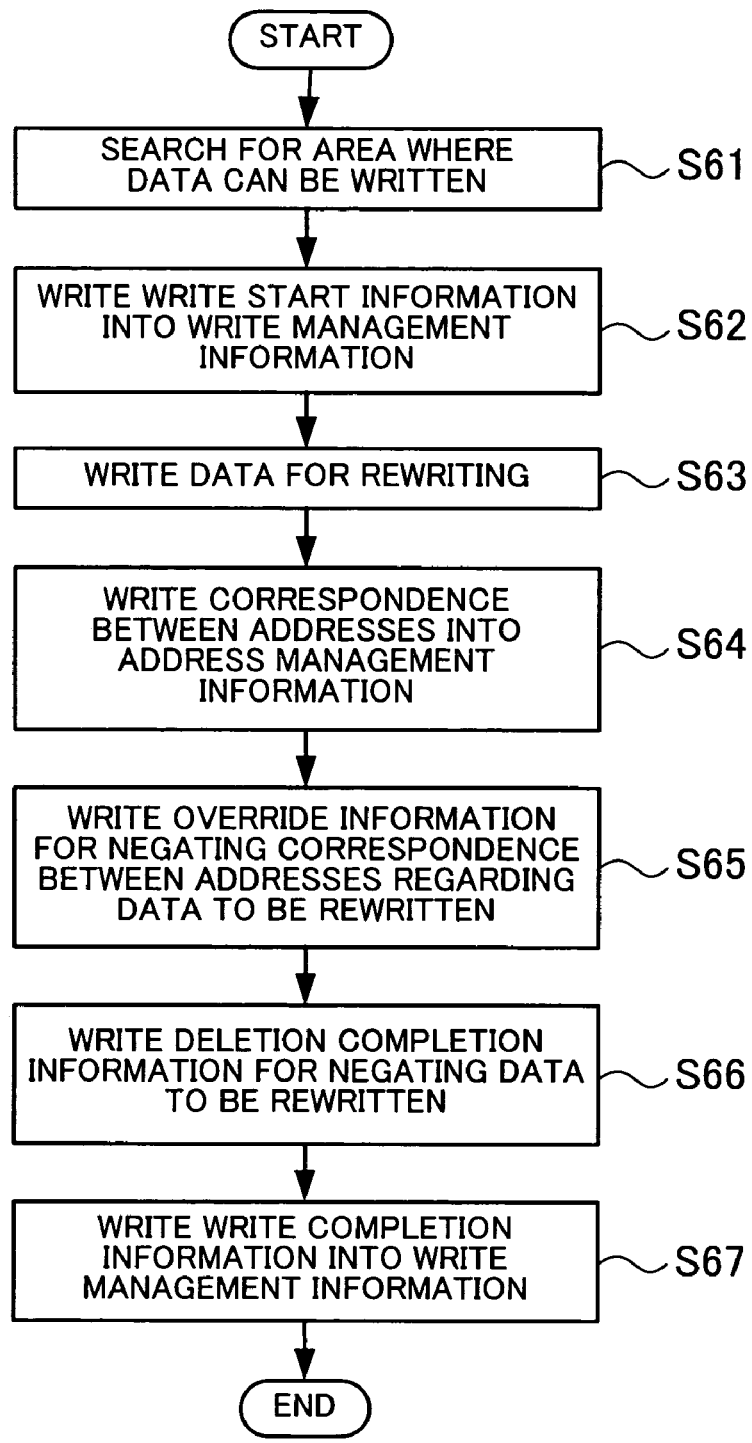
FIG. 9 is a flow chart showing procedures for the process of rewriting data performed by a driver.
Figure 10:
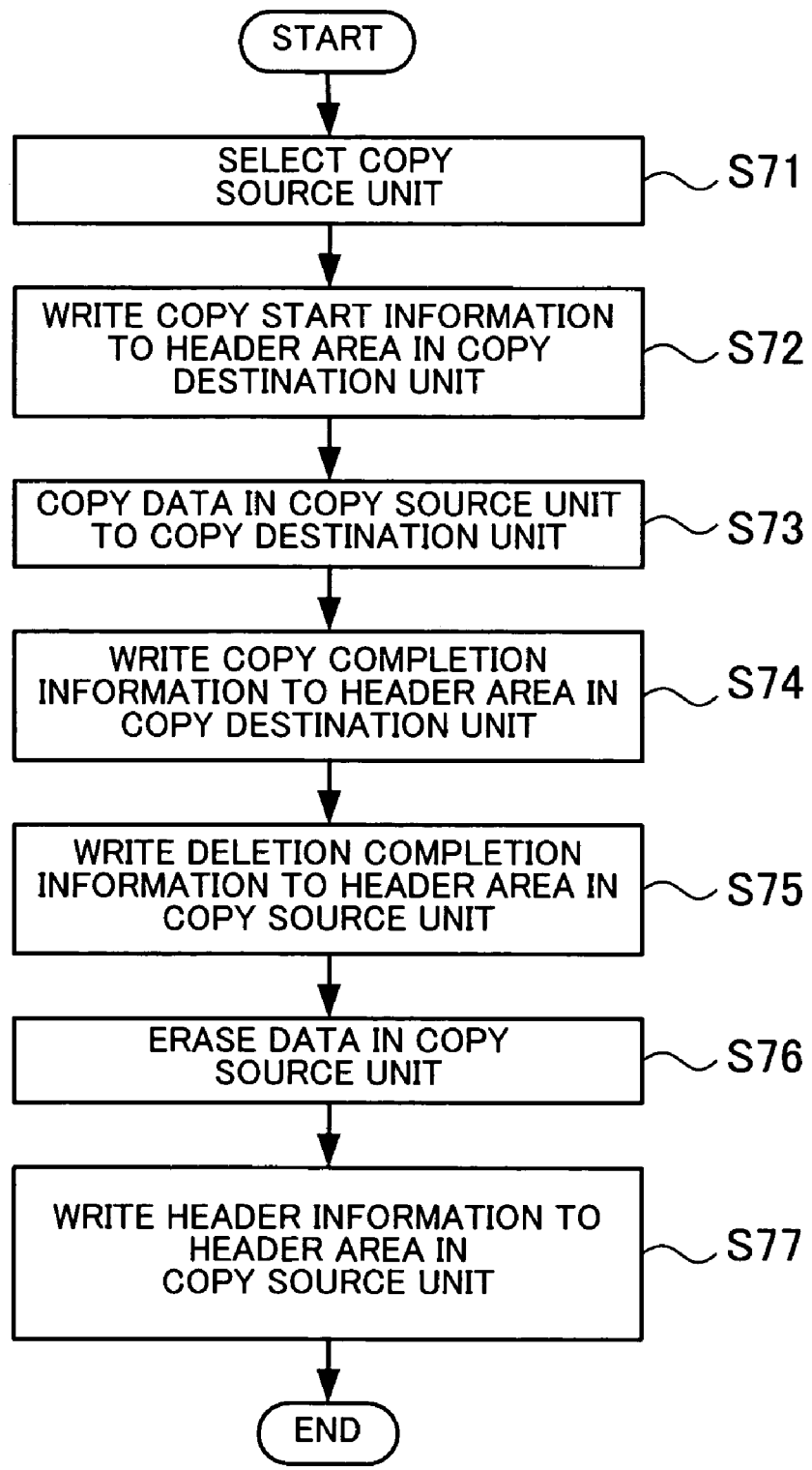
FIG. 10 is a flow chart showing procedures for a garbage collection process performed by a driver.

Garbage collection will now be described. FIG. 7 is a flow chart showing procedures for a garbage collection process performed by the CPU. In accordance with the following procedures the CPU 10a will perform garbage collection in the flash ROM 10d.

[Step S31] The data store section 11 in the CPU 10a selects a copy source unit (this unit means an erase unit) where negated data should be removed.

[Step S32] The management information store section 12 in the CPU 10a writes the copy write management information 16c indicative of the beginning of copying to a header area in a copy destination unit.

[Step S33] The completion information store section 13 in the CPU 10a writes the copy write completion flag 17c indicative of the completion of the writing of the copy write management information 16c in step S32 to the header area in the copy destination unit.

[Step S34] The data store section 11 in the CPU 10a copies valid data in the copy source unit to the copy destination unit. The data store section 11 refers to information, which is included in the write management information 16b and which indicates that data was deleted, selects only valid data not deleted, and copies it to the copy destination unit.

[Step S35] The management information store section 12 in the CPU 10a writes the copy write management information 16c indicative of the completion of copying to the header area in the copy destination unit.

[Step S36] The completion information store section 13 in the CPU 10a writes the copy write completion flag 17c indicative of the completion of the writing of the copy write management information 16c in step S35 to the header area in the copy destination unit.

[Step S37] The management information store section 12 in the CPU 10a writes the copy write management information 16c indicative of deletion to a header area in the copy source unit.

[Step S38] The completion information store section 13 in the CPU 10a writes the copy write completion flag 17c indicative of the completion of the writing of the copy write management information 16c in step S37 to the header area in the copy destination unit.

[Step S39] The data store section 11 in the CPU 10a erases all the data in the copy source unit.

[Step S40] The management information store section 12 in the CPU 10a writes header information to the header area in the copy source unit. The copy source unit becomes a spare unit.

[Step S41] The completion information store section 13 in the CPU 10a writes the copy write completion flag 17c indicative of the completion of the writing of the header information in step S40 to the header area in the copy destination unit.

It is assumed that while the CPU 10a is performing the process in step S32, S35, S37, or S40, the supply of power is shut off. When the supply of power returns to normal, the stored information judgment section 14 in the CPU 10a refers to the copy write completion flag 17c to judge whether the writing of the copy write management information 16c was completed. If the writing of the copy write management information 16c was completed, then the CPU 10a can perform a data restoration process properly by recopying the data. If the writing of the copy write management information 16c was not completed, then the CPU 10a can perform, for example, the process of restoring the copy write management information 16c. Alternatively, the CPU 10a may negate the copy write management information 16c so that it will not influence a subsequent process.

As stated above, when the writing of the address management information 16a, the write management information 16b, and the copy write management information 16c is completed, the address management completion flag 17a, the write completion flag 17b, and the copy write completion flag 17c, respectively, indicative of the completion of writing are stored. For example, when the supply of power is shut off and then returns to normal, whether the writing of management information was completed is judged by referring to these flags. Therefore, if the writing of management information was completed, the CPU 10a can perform a data restoration process properly by recopying the data.

In the above embodiment, the address management information 16a, the write management information 16b, the copy write management information 16c, the address management completion flag 17a, the write completion flag 17b, and the copy write completion flag 17c are stored in the flash ROM 10d. However, these management information and flags can be stored in a memory other than the flash ROM 10d where data will not disappear even in the case of the supply of power being shut off. That is to say, they may be stored in the RAM 10e shown in FIG. 2.

As has been described in the foregoing, in the present invention, storage completion information indicative of the completion of the storing of storage management information regarding the storage management of data in a nonvolatile memory is stored in the nonvolatile memory. When the process is interrupted and then returns to normal, whether the storing of the storage management information was completed is judged by referring to the storage completion information. As a result, when a process is interrupted and then returns to normal, a data restoration process can be performed properly.

The foregoing is considered as illustrative only of the principles of the present invention. Further, since numerous modifications and changes will readily occur to those skilled in the art, it is not desired to limit the invention to the exact construction and applications shown and described, and accordingly, all suitable modifications and equivalents may be regarded as falling within the scope of the invention in the appended claims and their equivalents.

What is claimed is:

1. A method for storing data in a nonvolatile memory which can be rewritten by a central processing unit, the method comprising the steps of:

storing storage management information regarding the storage management of data to be stored in the nonvolatile memory, including information indicative of the beginning of the storing of the data in the nonvolatile memory and information indicative of the completion of the storing of the data in the nonvolatile memory, a unit of the data being smaller than an erase unit in the nonvolatile memory;

storing storage completion information indicative of the completion of the storing of the storage management information in the nonvolatile memory; and judging, after a return from interruption of a process which occurred in the middle of the storage management information being stored, by referring to the storage completion information whether the storing of the storage management information is completed.

2. The method for storing data in a nonvolatile memory according to claim 1, wherein the storage management information includes an address in the nonvolatile memory designated on an application and an address in the nonvolatile memory where the data is actually stored.

3. The method for storing data in a nonvolatile memory according to claim 1, wherein the storage management information includes copy information regarding the copying of the data in a garbage collection process.

4. The method for storing data in a nonvolatile memory according to claim 1, wherein the storage management information includes a plurality of pieces of information regarding the storage management, further wherein the storage completion information is given to each of the plurality of pieces of information regarding the storage management.

5. The method for storing data in a nonvolatile memory according to claim 1, wherein the storage completion information is 1-bit data.

6. The method for storing data in a nonvolatile memory according to claim 1, wherein the storage management information and the storage completion information are stored in a volatile memory a power source for which is backed up by a battery.

7. A storage unit for storing data in a rewritable nonvolatile memory, the unit comprising:

a storage management information store section for storing storage management information regarding the storage management of data to be stored in the nonvolatile memory, including information indicative of the beginning of the storing of the data in the nonvolatile memory and information indicative of the completion of the storing of the data in the nonvolatile memory, the unit of the data being smaller than an erase unit in the nonvolatile memory;

a storage completion information store section for storing storage completion information indicative of the completion of the storing of the storage management information in the nonvolatile memory; and a stored information judgment section for judging, after a return from interruption of a process which occurred in the middle of the storage management information being stored, by referring to the storage completion information whether the storing of the storage management information is completed.

* * * * *